United States Patent
Howell et al.

(10) Patent No.: US 7,212,994 B2
(45) Date of Patent: May 1, 2007

(54) SYSTEM AND METHODS FOR DISSEMINATING REAL TIME INFORMATION

(75) Inventors: James F. Howell, Houston, TX (US); Robert L. Earthman, Jr., Houston, TX (US); Manmeet Singh, Houston, TX (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 0 days.

(21) Appl. No.: 09/736,707

(22) Filed: Dec. 15, 2000

(65) Prior Publication Data

US 2002/0077948 A1   Jun. 20, 2002

(51) Int. Cl.
*G06Q 40/00* (2006.01)

(52) U.S. Cl. .......................... 705/35; 705/37; 364/403; 364/408

(58) Field of Classification Search ................ 705/35, 705/37; 364/403, 408
See application file for complete search history.

(56) References Cited

U.S. PATENT DOCUMENTS

| | | | | |
|---|---|---|---|---|
| 5,289,372 A * | 2/1994 | Guthrie et al. | ............. | 340/5.92 |
| 5,983,227 A * | 11/1999 | Nazem et al. | ................ | 705/1 |
| 6,182,224 B1 * | 1/2001 | Phillips et al. | .............. | 713/201 |
| 6,195,647 B1 * | 2/2001 | Martyn et al. | ................ | 705/35 |
| 6,278,982 B1 * | 8/2001 | Korhammer et al. | ......... | 705/36 |
| 6,317,727 B1 * | 11/2001 | May | ........................... | 705/36 |
| 6,321,212 B1 * | 11/2001 | Lange | ........................... | 705/1 |
| 6,347,307 B1 * | 2/2002 | Sandhu et al. | ................ | 705/35 |
| 2002/0073011 A1 * | 6/2002 | Brattain et al. | ............... | 705/37 |
| 2002/0107770 A1 * | 8/2002 | Meyer et al. | ................. | 705/36 |
| 2002/0165812 A1 * | 11/2002 | Lukose | ....................... | 705/37 |

\* cited by examiner

*Primary Examiner*—Alain L. Bashore
(74) *Attorney, Agent, or Firm*—Bracewell & Giuliani LLP

(57) ABSTRACT

A system and method for real time dissemination of information is provided. One server receives and data bases the information while another server disseminates the information; instead of one server receiving the information, data basing the information, and disseminating the information to all users requesting the information.

15 Claims, 2 Drawing Sheets

SYSTEM AND METHODS FOR DISSEMINATING REAL TIME INFORMATION

BACKGROUND OF THE INVENTION

1. Field of the Invention

The present invention generally relates to data processing. Particularly, the present invention relates to a system and methods for disseminating information.

2. Description of the Related Art

It has long been recognized that accesses to timely information regarding current conditions in various commodities and financial markets are essential to profitable trading and investment. Many complex investment strategies require precise and careful timing of specific transactions in response to fluctuating market conditions. This is particularly true in today's fast-moving markets where the ability to respond quickly to changing market conditions may mean the difference between substantial profits or devastating losses. Many investors rely heavily on real-time stock quotes when implementing their investment strategies, and most of those investors get their real-time stock quotes from a brokerage company. Thus, a successful brokerage company must be able to provide stock quotes as accurately and efficiently as possible.

Stock quotes are currently provided by stock exchanges, such as New York Stock Exchange, NASDAQ, etc., to a field vender such as Bloomberg or Comstock. After parsing the stock quote information received from the stock exchanges, the field vender then sends the stock quote information to a quote server at a rate of about 1,000 to 2,000 packets per second. The quote server is typically located at a regional brokerage office such as TradeCast or Merrill Lynch. The quote server has a database and keeps track of the history of each specific stock quote. If the stock quote is not in the database, the quote server adds the stock quote to the database. If the stock quote is already in the database, then the quote server updates the database. Next, the quote server checks to see if a registered user has requested that particular stock quote. Most brokerage companies use a subscription based system. If one workstation or trader registers a particular stock quote, then every time the tick or quote comes in, the trader gets an update on that stock quote. If numerous customers are requesting a stock quote at the same time, then the quote server will take some time to send the requested stock quotes to all the requesting customers. If the quote server spends more time delivering stock quotes, however, then the quote server must spend less time getting stock quotes. Thus, when the above-mentioned response time to the requesting customers takes too long, the quote server may miss some of the stock quotes sent by the field vender. As a result, investors may not have the most current stock quote information needed to make intelligent trading decisions.

Consequently, it would be desirable to provide an improved method to disseminate the information, e.g., deliver stock quotes, to investors in real-time.

SUMMARY OF THE INVENTION

In view of the foregoing, embodiments of the present invention provide an improved method to disseminate the information to investors in real-time. In accordance with an embodiment of the present invention, quote information from a provider is received by a quote server. In response to a quote request from a user to a contact server, the contact server requests the quote request from the quote server. The quote server then sends a respective quote according to the quote request to the contact server. In turn, the contact server disseminates the quote to the user. By having to send the requested quote information only once, the quote server is able to spend more time in receiving quote information and less time in distributing the quote information. A contact server enables the system to serve 1,000–2,000 people per combination of the quote and contact server.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

The present invention will now be described more fully hereinafter with reference to the accompanying drawings, which illustrate embodiments of the invention.

Figure 1:
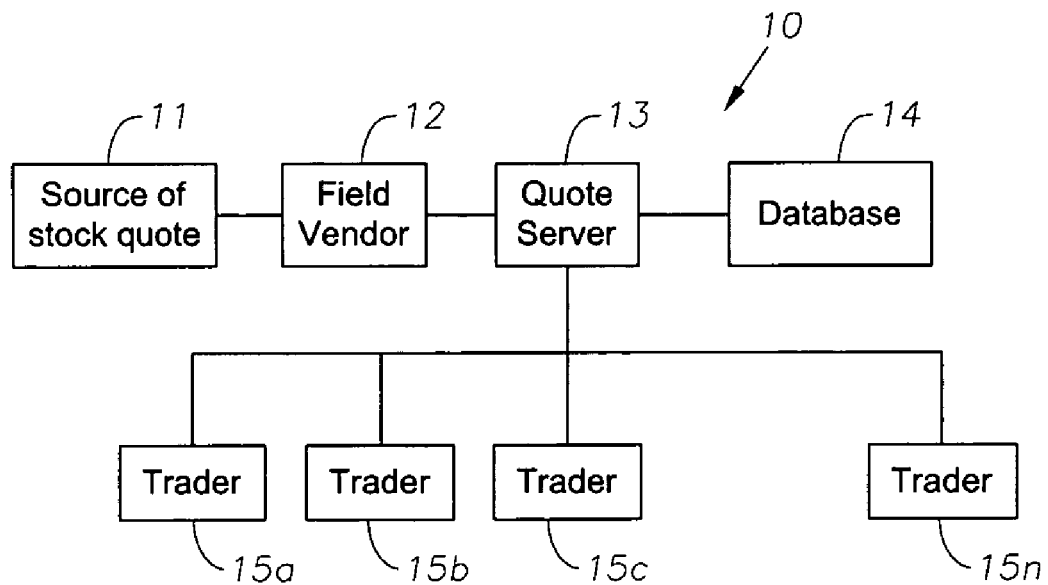
FIG. 1 is a block diagram of a stock quoting system according to the prior art.

Referring now to the drawings and in particular to FIG. 1, there is shown a block diagram of a stock quoting system according to the prior art. As shown, a stock quoting system 10 includes a quote server 13 and a database 14. Generally, stock quotes are sent from a source of stock quote 11 to a field vender 12 and then to quote server 13. Source of stock quote 11 are typically stock exchanges, such as the New York Stock Exchange, NASDAQ, etc. Field vender 12 is a trading vender such as Bloomberg or Comstock. Stock traders can request stock quotes from quote server via trading stations 15*a*–15*n*. In response to a stock quote request, quote server 13 would send a stock quote to a corresponding one or more of trading stations 15*a*–15*n*. Because stock quoting system 10 is a closed system, quote server 13 has to finish sending stock quotes to trading stations 15*a*–15*n* before quote server 13 can perform other important functions such as reading data from field vender 12. In other words, if quote server 13 spends more time delivering stock quotes, then quote server 13 has to spend less time obtaining stock quotes. As a result, quote server 13 may miss a stock quote (or data packet) from field vender 12. Because quote server 13 does not have the most current stock quote, database 14 could not be updated, and a trader would not have the most current stock quote information needed to make intelligent trading decisions.

Figure 2:
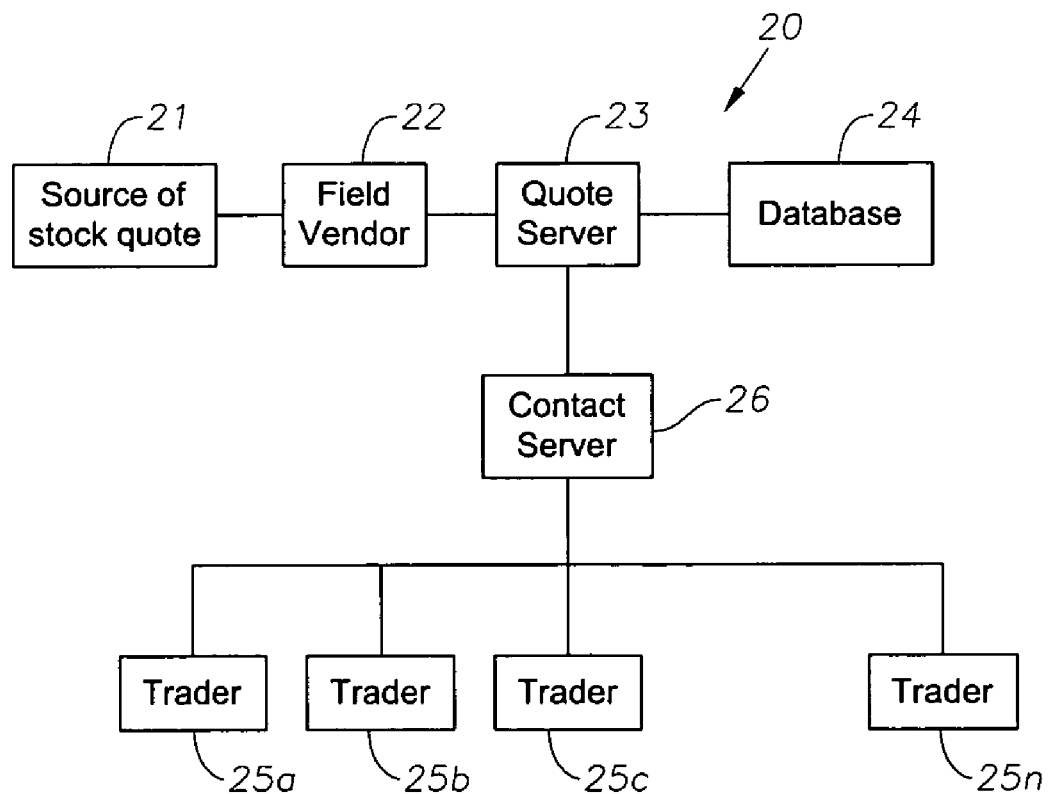
FIG. 2 is a block diagram of a stock quoting system in accordance with an embodiment of the present invention.

With reference now to FIG. 2, there is shown a block diagram of a stock quoting system in accordance with a preferred embodiment of the present invention. As shown, a stock quoting system 20 includes a quote server 23, a database 24 and a contact server 26. Stock quotes are sent from a source of stock quote 21 to a field vender 22 and then to quote server 23. Source of stock quote 21 can be any exchange that generates stock quotes similar to source of stock quote 11 depicted in FIG. 1. Field vender 22 parsers the information and multiplexes it to quote server 23 at a rate of approximately 1,000–2,000 stock quotes (or packets) per second. Quote server 23 can be any type of server capable of receiving and transmitting information, and can be located in a regional brokerage office such as TradeCast or Merrill Lynch. Quote server 23 is coupled to database 24 that keeps track of the history of each specific stock quote. If a quote for a particular stock is not in database 24, quote server 23 will add the missing stock quote to database 24. If the stock quote is already in database 24, quote server 23 will update database 24 with the latest information. Stock traders can request stock quotes from contact server 26 via trading stations 25a–25n. Contact server 26 may be, for example, a workstation, a mid-range computer or a mainframe computer. In addition, contact server 26 may be coupled to a network such as a local-area network (LAN) or a wide-area network (WAN). In response to a stock quote request, contact server 26 would send a stock quote to a corresponding one or more of trading stations 25a–25n.

Figure 3:
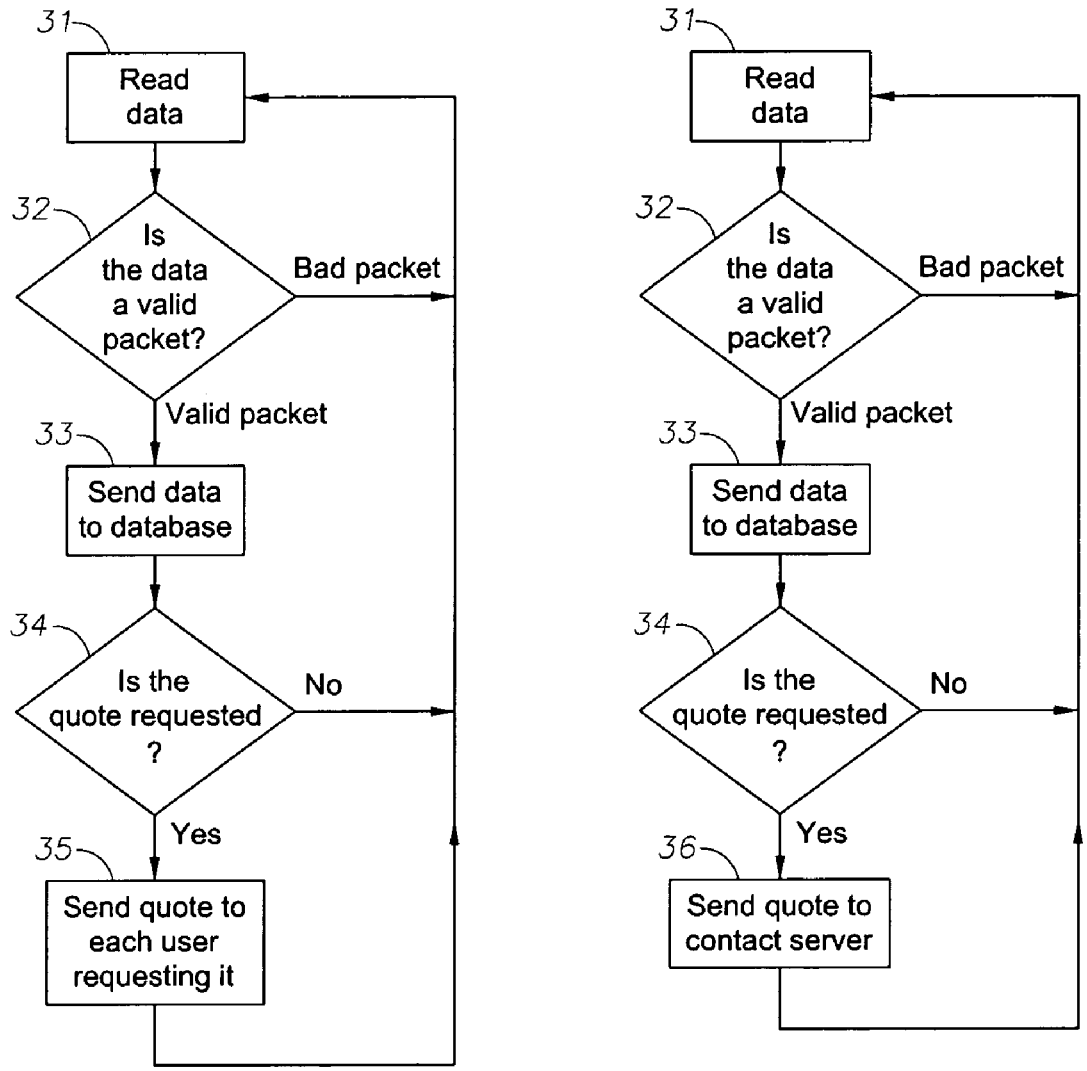
FIG. 3 is a flow chart of a stock quoting system according to the prior art.
Figure 4:
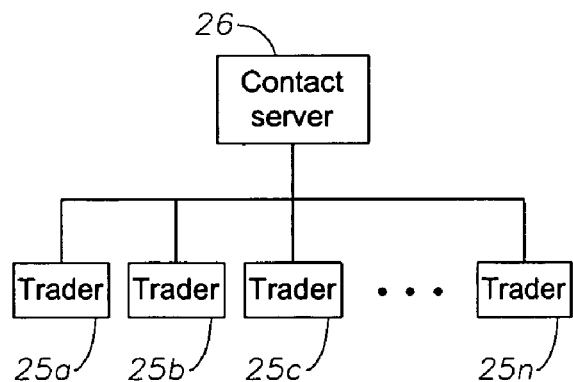
FIG. 4 is a flow chart of a method for delivering stock quotes in real-time utilizing the stock quoting system in FIG. 2, in accordance with an embodiment of the present invention.

Referring now to FIG. 4, there is illustrated a flow chart of a method for delivering stock quotes in real-time utilizing stock quoting system 20, in accordance with a preferred embodiment of the present invention. After data has been received by a quote server, as shown in block 31, a determination is made by the quote server as to whether or not the received data is a valid packet, as depicted in block 32. If the received data is a valid packet, the received data will be stored in a database coupled to the quote server, as shown in block 33. Otherwise, the received data will be discarded or ignored. Then, the quote server checks to see if a contact server is requesting a particular stock quote, as shown in block 34. If the contact server is requesting a stock quote, the quote server sends the stock quote to the contact server, as depicted in block 36. The contact server may send the stock quote to all traders who have requested that particular stock quote. If no trader has made a stock quote request, then the contact server does not request any stock quote from the quote server. By comparison, FIG. 3 illustrates a flowchart according to the prior art where hundreds of traders would request a stock quote whereby quote server 13 would have to send each trader the stock quote, shown in steps 34 and 35.

As has been described, the present invention provides an improved method for delivering stock quotes in real-time. Because the quote server sends a stock quote to the contact server only when a stock quote request has been made from a trader via the contact server, the quote server is not burdened with the responsibility of delivering stock quotes for each stock quote request. As such, the quote server can dedicate more processing for receiving new stock quote information from a field vender.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for disseminating stock quotes in real time, said method comprising:
   receiving stock quote information from a field vender by a quote server;
   in response to a stock quote request from a user by a contact server, said contact server requesting said stock quote request from said stock quote server;
   sending a respective stock quote according to said stock quote request to said contact server by said quote server; and
   disseminating said stock quote to said user by said contact server.

2. The method of claim 1, wherein said contact server is a workstation.

3. A stock quoting system comprising:
   a quote server positioned to receive stock quote information from a field vender;
   a contact server positioned to request a stock quote request from said quote server in response to said stock quote request being requested by a user;
   means for sending a respective stock quote according to said stock quote request to said contact server by said quote server; and
   means for disseminating said stock quote to said user by said contact server.

4. The stock quoting system of claim 3, wherein said contact server is a workstation.

5. The method as defined in claim 2, further comprising: determining by the quote server if the contact server is requesting a particular stock quote.

6. The method as defined in claim 5, wherein the contact server is a workstation.

7. The method as defined in claim 5, wherein a database is associated with the quote server, and the method further comprises tracking the history of each particular stock quote using the database.

8. The method as defined in claim 7, further comprising:
   receiving the particular stock quote;
   determining if the particular stock quote is in the database;
   adding the particular stock quote to the database if the particular stock quote is not in the database; and
   updating the database if the particular stock quote is already in the database.

9. The stock quoting system as defined in claim 3, wherein the means for disseminating said stock quote to said user includes means for disseminating said stock quote to a plurality of users, and wherein the plurality of users is a respective plurality of trading stations requesting said stock quote.

10. The stock quoting system as defined in claim 9, further comprising a database associated with the quote server and positioned to track the history of each particular stock quote, and wherein the quote server is further positioned to determine if the particular stock quote is in the database, add the particular stock quote to the database if the particular stock quote is not in the database, and update the database if the particular stock quote is already in the database.

11. A system for disseminating real time information comprising:
- a quote server positioned to receive stock quote information from a field vender;
- a contact server positioned to request a stock quote from the quote server responsive to the stock quote request being requested by a user;
- means associated with the quote server and responsive to the stock quote request for sending a stock quote to the contact server; and
- means associated with the contact server for disseminating the stock quote received from the quote server to at least one user.

12. The system as defined in claim 11, wherein the contact server is a workstation.

13. The system as defined in claim 11, further comprising a database associated with the quote server and positioned to track the history of each particular stock quote, and wherein the quote server further positioned to determine if the particular stock quote is in the database, add the particular stock quote to the database if the particular stock quote is not in the database, and update the database if the particular stock quote is already in the database.

14. The method of claim 1, wherein the step of disseminating said stock quote to said user by said contact server includes disseminating said stock quote to a plurality of users by said contact server, and wherein said plurality of users are a corresponding plurality of trading stations.

15. The system as defined in claim 11, wherein the at least one user is a plurality of users, and wherein said plurality of users are a corresponding plurality of trading stations.

* * * * *